(12) United States Patent
Oda et al.

(10) Patent No.: US 7,336,301 B2
(45) Date of Patent: Feb. 26, 2008

(54) SOLID-STATE IMAGE SENSOR AND A METHOD OF ADJUSTING OUTPUT OF PHOTOSENSITIVE CELLS ADAPTIVELY TO THE SENSITIVITY

(75) Inventors: Kazuya Oda, Asaka (JP); Hirokazu Kobayashi, Asaka (JP)

(73) Assignee: FUJIFILM Corporation, Kanagawa (JP)

(*) Notice: Subject to any disclaimer, the term of this patent is extended or adjusted under 35 U.S.C. 154(b) by 725 days.

(21) Appl. No.: 10/642,625

(22) Filed: Aug. 19, 2003

(65) Prior Publication Data

US 2004/0051792 A1    Mar. 18, 2004

(30) Foreign Application Priority Data

Aug. 19, 2002    (JP) .............................. 2002-237881

(51) Int. Cl.
  *H04N 5/235* (2006.01)
  *H04N 9/083* (2006.01)
  *H04N 5/238* (2006.01)

(52) U.S. Cl. .................... 348/229.1; 348/273; 348/364

(58) Field of Classification Search ............. 348/229.1, 348/315, 367, 296; 257/222, 225, 229
See application file for complete search history.

(56) References Cited

U.S. PATENT DOCUMENTS 6,236,434 B1    5/2001 Yamada

| 6,628,334 | B1* | 9/2003 | Gaylord | 348/364 |
|---|---|---|---|---|
| 7,041,950 | B2* | 5/2006 | Nagano | 250/201.2 |
| 7,053,954 | B1* | 5/2006 | Canini | 348/362 |

FOREIGN PATENT DOCUMENTS

| JP | 3-60286 A | 3/1991 |
|---|---|---|
| JP | 4-97651 A | 3/1992 |
| JP | 5-64083 A | 3/1993 |
| JP | 9-205589 A | 8/1997 |
| JP | 10-136391 A | 5/1998 |
| JP | 10-200796 A | 7/1998 |
| JP | 2000-165753 A | 6/2000 |

* cited by examiner

*Primary Examiner*—Ngoc Yen Vu
*Assistant Examiner*—Albert H Cutler
(74) *Attorney, Agent, or Firm*—Birch, Stewart, Kolasch & Birch, LLP (57) ABSTRACT

A solid-state image pickup apparatus includes a solid-state image sensor in which photosensitive cells, each consisting of a main and a subregion and including an optical opening, are arranged in a bidimensional array. A system controller adjusts the exposure times of the main and subregions in dependence upon the direction and amount of a sensitivity error in the vertical direction relative to an accurate optical opening. A timing signal generator feeds a timing signal to a driver in response to a control signal output from the system controller. The driver feeds, in response to the timing signal and a control signal also output from the system controller, the image sensor with a drive signal relating to the opening/closing of a mechanical shutter, thereby causing the above exposure times to end at the same time. Therefore, signal charges output from the main and subregions are free from errors.

18 Claims, 6 Drawing Sheets

SOLID-STATE IMAGE SENSOR AND A METHOD OF ADJUSTING OUTPUT OF PHOTOSENSITIVE CELLS ADAPTIVELY TO THE SENSITIVITY

This nonprovisional application claims priority under 35 U.S.C. § 119(a) on patent application No(s). 2002-237881 filed in JAPAN on Aug. 19, 2002, which is (are) herein incorporated by reference.

BACKGROUND OF THE INVENTION

1. Field of the Invention

The present invention relates to a solid-state image pickup apparatus including a solid-state image sensor in which photosensitive cells for photoelectric transduction are arrayed in a so-called honeycomb arrangement, and a method of adjusting the outputs of, e.g. an array of photosensitive cells, each of which includes a set of photosensitive regions different insensitivity from each other, for compensating for sensitivity errors.

2. Description of the Background Art

Generally, a solid-state image pickup apparatus is apt to generate moiré and other false signals. Japanese Patent Laid-Open Publication No. 136391/1998, for example, discloses a solid-state image pickup apparatus configured to receive the increased quantity of incident light with pixels densely arranged, thereby promoting efficient receipt of light. The apparatus taught in this document provides a new structure that optimizes spatial sampling of an image and is referred to as a honeycomb pixel arrangement.

In the honeycomb pixel arrangement, assuming that the distance between nearby pixels on the same row or the same column is defined as a pitch, then pixels around a given pixel each are shifted from the given pixel by half the pitch in the direction of row and/or the direction of column. In a CCD (Charge-Coupled Device) type of solid-state image sensor having the honeycomb pixel arrangement, vertical transfer registers constitute vertical transfer paths extending zigzag in such a manner as to skirt round the pixels. Color filter segments are assigned to, among the pixels, actual pixels that actually exist. The pixels, or photosensitive cells, photoelectrically transduce light incident thereto through the color filter segments to generate signal charges having color attributes. The signal charges are then sequentially routed through the vertical transfer registers and horizontal transfer register, which constitutes a horizontal transfer path disposed perpendicularly to the vertical transfer paths, to an output amplifier. The output amplifier performs Q/V conversion for outputting voltage signals in the form of analog signals.

Subsequently, the analog signals are subjected to signal processing. First, a correlation between pixel data is determined with consideration given to the colors of actual pixels. More specifically, pixel data of a color in question closely correlated to each other are used to estimate pixel data at a virtual pixel, defined as a pixel at which the actual pixels are not positioned, and pixel data at actual pixels of a color different from the color in question. Subsequently, one of such pixel data appearing in a direction closer in correlation than the remaining pixel data is used for interpolating virtual pixels. Such interpolation successfully reduces false signals. Further, the pixel data are successfully broadened in frequency band, enhancing resolution.

It has also been proposed to use the honeycomb pixel arrangement for further enhancing the resolution of an image and broadening the dynamic range of image signals generated. In accordance with a specific conventional scheme directed toward this object, the photosensitive area of the individual photosensitive cell is divided into a major region and a subregion different in size from each other, so that signal charges are read out from the two regions independently of each other. This scheme broadens the dynamic range utilizing the difference in sensitivity between the main and subregions. In a usual reading mode, the signal charges of the main and subregions are mixed together and read out in the conventional manner.

Processing for broadening the dynamic range utilizes the sensitivity difference and the saturation in a pair of photosensitive regions.

The sensitivity difference between a pair of photosensitive regions of a photosensitive cell depends upon, for example, the difference in area between optical openings or apertures formed over the regions. More specifically, paying attention to a single photosensitive cell, an optical opening for passing incident light is formed smaller in area than the entire photosensitive region of the cell. Therefore, so long as the photosensitive region is relatively large in area, as with the main region, even if a mask for fabricating the opening is slightly set off during manufacturing in a planar direction of the region, the photosensitive region having the opening finished will be able to successfully absorb the affect by the off-set mask due to the relatively large area thereof.

However, an opening area formed in the subregion of a photosensitive cell, which is smaller in area than in the main region, is relatively small and therefore susceptive to the offset of the mask for fabrication the opening. As a result, an error may often be introduced in the optical sensitivity of the subregion in dependence upon the degree of accuracy in aligning the mask. If such a sensitivity error is remarkable, then it is likely that the signal processing for broadening the dynamic range is not practicable at all.

SUMMARY OF THE INVENTION

It is an object of the present invention to provide a solid-state image pickup apparatus and a method of compensating for the sensitivity error ascribable to the subregion of photosensitive cells to adaptively adjust the output of the cells to thereby surely broaden the dynamic range.

A solid-state image pickup apparatus of the present invention includes a solid-state image sensor in which a plurality of photosensitive cells are arranged in a two-dimensional array for converting incident light to electric signals, each of the plurality of photosensitive cells including a main region and a subregion smaller in area than the main region. A shutter adjusts the end of an exposure time over which light incident to the image sensor is subject to photoelectric transduction. A sensitivity control circuit compares actual sensitivity of each subregion for a predetermined quantity of light with predetermined sensitivity of the subregion for the same quantity of incident light to determine a sensitivity error and adjusts the sensitivity error. A system controller controls, in response to an image pickup operation meant for the image sensor, the sensitivity control circuit in dependence upon the direction of the sensitivity error.

A method of adjusting the output from photosensitive cells adaptively to the sensitivity of the cells is also provided for the above image pickup apparatus.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
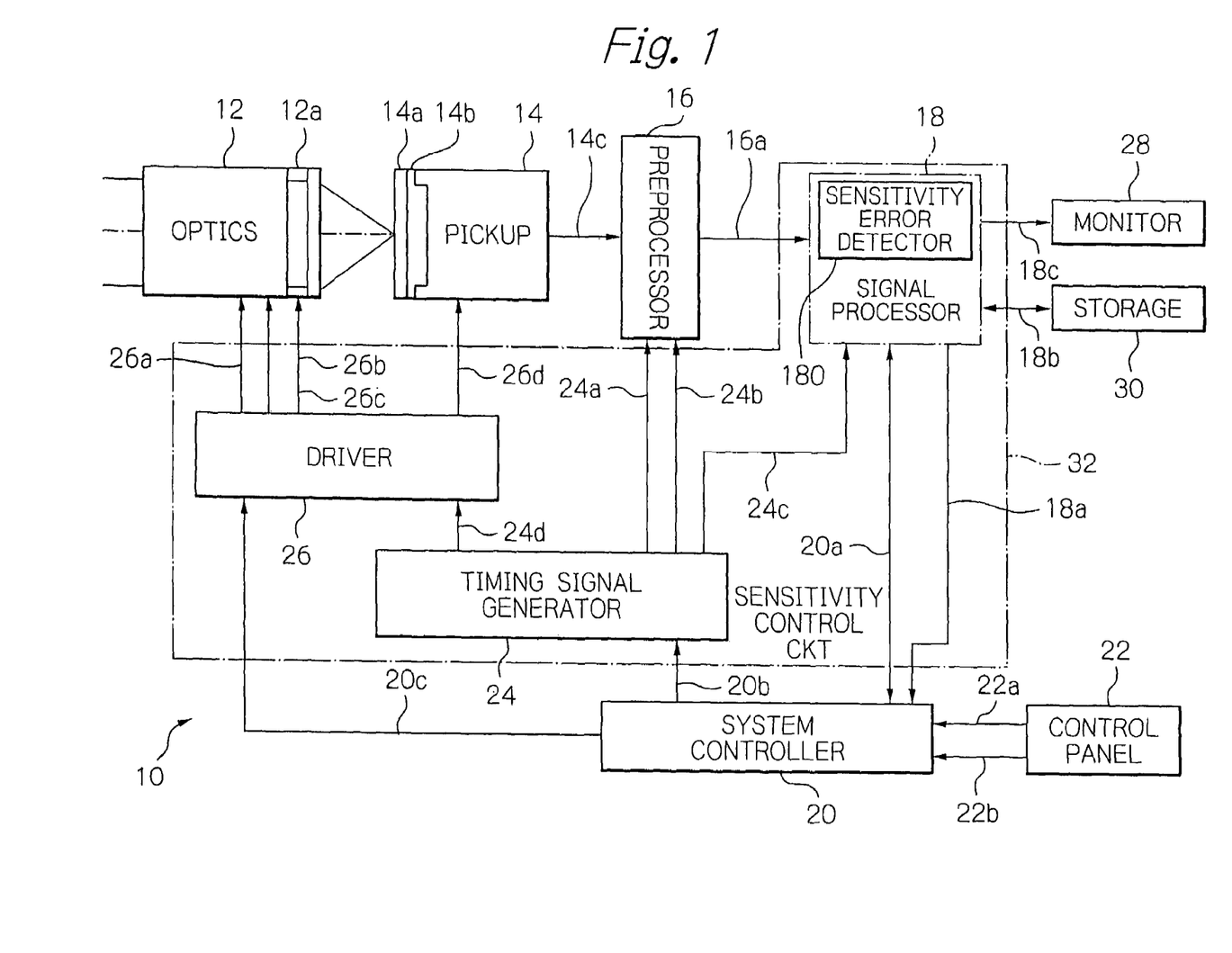
FIG. 1 is a schematic block diagram showing a solid-state image pickup apparatus embodying the present invention.

Referring to FIG. 1, an image pickup apparatus embodying the present invention is implemented by a digital camera by way of example. Part of the illustrative embodiment not relevant to the understanding of the present invention is not shown and will not be described specifically. Signals are designated by reference numerals attached to connections on which they appear.

As shown in FIG. 1, the digital camera, generally 10, includes optics 12, an image pickup section 14, a preprocessor 16, a signal processor 18, a system controller 20, a control panel 22, a timing signal generator 24, a driver 26, a monitor 28, and a storage 30 interconnected as illustrated. In the illustrative embodiment, the digital camera 10 additionally includes a sensitivity control circuit 32 including the signal processor 18, timing signal generator 24, and driver 26.

The optics 12 includes a mechanical shutter 12a and lenses, a zoom mechanism, an iris control mechanism, and an AF (Automatic Focus) control mechanism that are not shown in FIG. 1.

The zoom mechanism controls the angle of viewing a scene to be picked up while the AF mechanism automatically shifts the lenses to focus the camera 10 on a desired subject. A particular motor is assigned to each of the zoom mechanism and AF control mechanism for translating the lenses back and forth on the optical axis thereof and is driven by a drive signal 26a fed from the driver 26.

The iris control mechanism is an AE (Automatic Exposure) control mechanism for adjusting the received quantity of incident light and turns its ring portion in response to a drive signal 26b fed from the drier 26. The ring portion causes blades thereof to overlap each other to form around iris or lens opening, so that an incident light beam is restricted by the iris. Alternatively, the iris control mechanism may be implemented as a mechanical shutter built in the lenses of the optics 12.

The mechanical shutter 12a prevents light from being incident to the image pickup section 14 except for the time of image pickup or shooting and functions to determine an exposure time on the basis of the start and end of exposure. The mechanical shutter may be implemented as a focal plane shutter customary with a single-lens reflex camera and configured to cause its shutter screens to run vertically or horizontally for thereby effecting slit exposure. Alternatively, the mechanical shutter may be implemented as a lens shutter, as mentioned above. In any case, the mechanical shutter selectively opens or closes in response to the drive signal 26c.

The image pickup section 14 includes an optical low-pass filter 14a and a solid-state image sensor 14b which has a color filter, not shown, positioned on an array of photosensitive cells 140. The low-pass filter 14a limits the spatial frequency of incident light to a range below the Nyquist frequency.

Figure 2A:
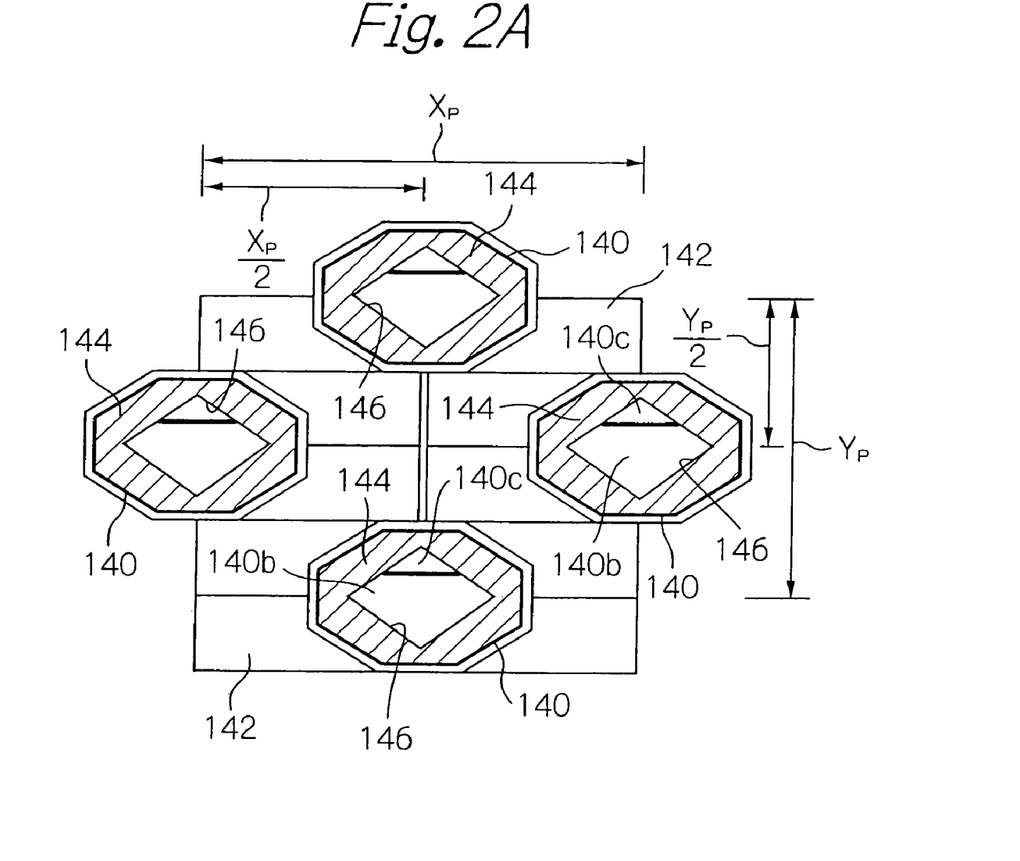
FIG. 2A schematically shows part of a solid-state image sensor included in the illustrative embodiment in a plan view as seen from the light incidence side.

FIG. 2A shows part of the image sensor 14b in an enlarged scale. As shown, the image sensor 14b is implemented by CCDs (Charge-Coupled Devices), and includes photosensitive cells 140 which are adapted to photoelectrically transduce incident light to corresponding photoelectric charges. The photosensitive cells 140 on the same row are arranged at a pixel pitch of $X_p$ while the photosensitive cells 140 on the same column are arranged at a pixel pitch of $Y_p$. Further, the photosensitive cells 140, adjoining a given photosensitive cells 140, each are spaced from the given cell by the pixel pitches of $X_p/2$ and $Y_p/2$ in the directions of row and column, respectively. In this configuration, the photosensitive cells 140 are densely arranged in the image sensor 14b. Vertical transfer registers 142 are formed between nearby columns of photosensitive cells 140 while extending zigzag in such a manner as to skirt round the cells 140.

Figure 2B:
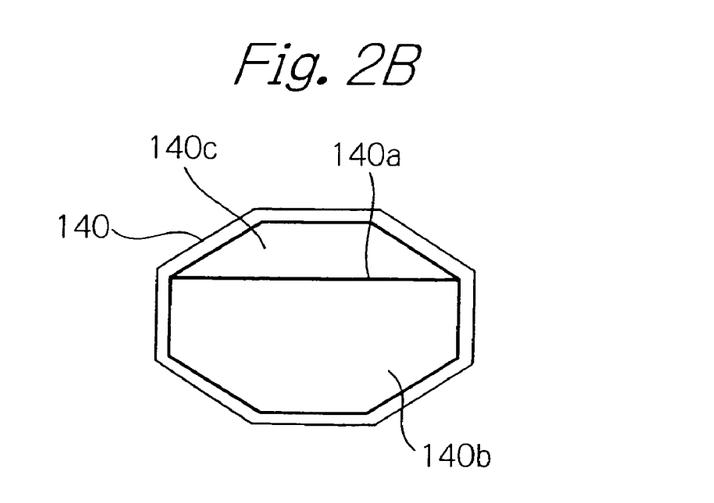
FIG. 2B schematically shows in an enlarged view the photosensitive regions of a photosensitive cell included in the image sensor shown in FIG. 2A.

As shown in FIG. 2B, with the illustrative embodiment, each photosensitive cell 140 has an octagonal shape in a plane perpendicular to the optical axis of the optics 12 and its photosensitive area partitioned into a main region 140b and a subregion 140c by a boundary region 140a. The main and subregions 140b and 140c respectively occupy a relatively larger area and a relatively smaller area of the photosensitive cell 140 and therefore have higher sensitivity and lower sensitivity to incident light, respectively.

Referring again to FIG. 2A, a light-screening layer 144 is formed in part of the individual photosensitive cell 140 indicated by hatching in such a manner as to cover peripheral part of the photosensitive area of the cell 140 to intercept incident light thereat. Each light-screening layer 144 has an optical opening or aperture 146 cut that permits the incident light to pass therethrough. The light-screening layers 144 are configured to fully cover the vertical transfer registers 142, although not shown specifically.

Now reverting to FIG. 1, the driver 26 feeds drive signals 26d to the image sensor 14b as well. The dive signals 26d may include a horizontal and a vertical drive signal ɸH and ɸV, respectively, and an OFD (OverFlow Drain) signal in dependence upon the operation mode.

Considering the amount of saturation, the image sensor 14b is configured to sequentially read out signal charges from the main or major regions 140b and subregions 140c of the photosensitive cells 140 in this order. Stated another way, the signal charges of the main regions 140b and those of the subregions 140c are read out independently of each other in an interlacing fashion. The signal charges are fed from the pickup section 14 to the preprocessor 16 in the form of analog voltage signals.

The preprocessor includes a CDS (Correlated Double Sampling) circuit, a GCA (Gain-Controlled Amplifier), and an ADC (Analog-to-Digital Converter) although not shown specifically. The CDS circuit and AD converter respectively receive CDS pulses 24a and a conversion clock signal 24b from the timing signal generator 24. The preprocessor 16 cancels noise contained in the input analog voltage signals 14c, shapes the wave of the resulting noise-free voltage signals and then digitizes the wave-shaped voltage signals, outputting resultant image data 16a. The image data 16a thus output are all delivered to the signal processor 18.

The signal processor 18 includes a sensitivity error detector 180 and, in addition thereto, a signal generating circuit, a memory, a gamma correcting circuit, an exposure value calculating circuit, a pixel interpolating circuit, a color difference matrix processing circuit and a compressing/expanding circuit that are not shown in FIG. 1. The signal processor 18 receives a control signal 20a from the system controller 20. The signal generating circuit operates in response to the control signal 20a and includes a PLL (Phase-Locked Loop) capable of generating a plurality of different frequencies. More specifically, the signal generating circuit multiplies the oscillation frequency of an oscillator, or reference clock, to generate a plurality of clock signals each having a particular frequency. The clock signals are selectively fed to the system controller 20 and timing signal generator 24.

The timing signal generator 24 feeds timing signals 24c to the signal processor 18. The timing signals include a horizontal synchronizing signal HD, a vertical synchronizing signal VD and clock signals meant for various sections, which will be described later.

The image data 16a output from the preprocessor 16 are input to the memory and temporarily stored therein. In the illustrative embodiment, the memory has two storage spaces for respectively storing image data output from the main regions 140b and image data output from the subregions 140c in the event of a single shot. The memory utilizes the two storage spaces in consideration of the positions of the photosensitive cells in the photosensitive array to rearrange the input image data. The memory should preferably be implemented by a nonvolatile memory to cope with repeated storage and read-out. The pixel data temporarily stored in the memory are delivered to the gamma correcting circuit.

On the other hand, when an adjustment mode is selected before shipment, the pixel data temporarily stored in the above memory are fed to the sensitivity error detector 180, which additionally includes a memory assigned to sensitivity detection and a decision circuit although not shown specifically. The memory assigned to sensitivity detection is adapted to store reference pixel data. The reference pixel data are to be read out from the subregions 140c, which have the optical openings 146 thereof cut by an accurate fabricating mask, when the subregions 140c accurately receive a predetermined quantity of incident light. The decision circuit compares actual pixel data derived from the subregions 140c with the reference pixel data when the predetermined quantity of light is incident, thereby calculating a sensitivity error. The sensitivity error detector 180 feeds the direction and the amount of the sensitivity error thus determined to the system controller 20 as a measured value 18a.

It is to be noted that the sensitivity error detector 180 may be positioned outside of the digital camera 10 in the form of a jig and adapted to feed only the results of measurement to the system controller 20.

The gamma correcting circuit uses, e.g. data listed in a lookup table to execute gamma correction on the input image data, as part of image preprocessing. Further, the image data thus subjected to gamma correction are input to the exposure value calculating circuit and pixel interpolating circuit.

The exposure value calculating circuit includes an operating circuit for calculating an F-number, a shutter speed, a white balance (WB) adjusting value, and a tonality correcting value. In the exposure value calculating circuit, the operating circuit calculates integrated values 18a for various parameters on the basis of the input image data and delivers the integrated values 18a to the system controller 20 as parameters.

If desired, the exposure value calculating circuit may be included in the system controller 20, in which case the gamma-corrected image data output from the signal processor 18 will be delivered to the system controller 20.

The pixel interpolating circuit generates pixel data to be interpolated. More specifically with the embodiment, because the pickup section 14 uses a single color filter, the photosensitive cells included in the section 14 cannot generate colors other than the colors of the actual color filter segments. To solve this problem, in a camera or still picture mode available with the digital camera 10, the pixel interpolating circuit generates pixel data representative of the colors other than the colors of the actual color filter segments, feeding the resulting planar image data to the color matrix processing circuit. It is to be noted that the pixel interpolating circuit may additionally function to broaden the frequency band of the image data thus generated.

The color matrix processing circuit uses the image data fed from the pixel interpolating circuit and preselected coefficients to generate luminance data Y and color data $C_b$ and $C_r$. The luminance data Y and color data $C_b$ and $C_r$ so generated are input to the compressing/expanding circuit. Let these data Y, $C_b$ and $C_r$ be referred to as image data Y/C hereinafter.

The compressing/expanding circuit compresses, in the camera mode or a movie mode also available with the digital camera 10, the image data Y/C under, e.g. the JPEG (Joint Photographic coding Experts Group) or the MPEG (Moving Picture coding Experts Group)-1 or MPEG-2 standard. The compressing/expanding circuit stores the compressed image data (Y/C) 18b in the storage 30. Also, the compressing/expanding circuit reads out the image data 18b from the storage 30 and expands them. Expansion is in inverse procedure to compression.

Further, the signal processor 18 transforms the image data generated or the image data Y/C read out and expanded to R, G and B image data 18c, and feeds the image data 18c to the monitor 28. The monitor 28 is controlled by a display controller, not shown, to display the image data 18c in the form of a visual picture.

The system controller 20 is implemented by a microcomputer or a CPU (Central Processing Unit) for controlling the sections of the camera 10 and sections assigned to digital processing. More specifically, the system controller 20 establishes either one of the camera mode and movie mode in the camera 10 in response to a mode signal 22a received from the control panel 22. Also, the system controller 20 is responsive to the mode signal 22a and a trigger signal 22b, which is output from a shutter release button, not shown, included in the control panel 22 to generate control signals 20a, 20b and 20c in dependence upon the integrated values 18a. The trigger signal 22b defines image pickup timing. The control signals 20a, 20b and 20c are fed to the signal processor 18, timing signal generator 24 and driver 26, respectively. In the illustrative embodiment, the system controller 20 controls the exposure timing by taking account of the sensitivity error of the subregions 140c in addition to the integrated values 18a.

The system controller 20 generates the control signal 20a by taking account of control over line interpolation and signal generation in the signal processor 18 and control necessary for signal processing as well. Further, the system controller 20 controls the storing and reading of image data in and from the storage 30, specific connections being not specifically shown.

The control panel 22 includes a mode selector in addition to the shutter release button. The mode selector is operated to select either one of the camera mode and movie mode and delivers in turn the previously mentioned mode signal 22a to the system controller 20. The shutter release button has a first and a second stepwise stroke. More specifically, the shutter release button conditions the camera 10 for preliminary image pickup when depressed in its first stroke or conditions it for actual image pickup when depressed in its second stroke. The control panel 22 may additionally include a zoom select switch and direction keys, and may be configured to allow the operator to select conditions displayed on an LCD (Liquid Crystal Display) panel.

The timing signal generator 24 is fed with a clock signal, not shown, as a reference clock signal from the signal processor 18. The timing signal generator 24 generates timing signals on the basis of the reference clock signal and control signal 20b, which is fed from the system controller 20. The above timing signals include a vertical and a horizontal synchronizing signal, field shift pulses, a vertical and a horizontal transfer signal, an electronic shutter drive pulse as well as CDS pulses 24a and conversion clock signal 24b. Those timing signals, collectively labeled 24d and including the vertical and horizontal synchronizing signals, field shift pulses, vertical and horizontal transfer signals and electronic shutter drive pulse, are selectively delivered to the driver 26 while the CDS pulses 24a and conversion clock signal 24b are delivered to the preprocessor 16. The timing signal 24c is fed to the signal processor 22.

The driver 26 includes a drive circuit, not shown, for generating the drive signals 26a through 26d on the basis of the timing signals 24d and control signal 20c input thereto. More specifically, the driver 26 feeds, in response to the control signal 20c, the drive signals 26a and 26b to the lens system of the optics 12 and iris control mechanism, respectively, for thereby causing them to perform AF control and AE control. Also, the driver 26 delivers the drive signal 26c to the mechanical shutter 12a at the image pickup timing output from the shutter release, causing the mechanical shutter to open and then close.

Further, the driver 26 produces and feeds the drive signal 26d to the image sensor 14b on the basis of the timing signals 24d. The drive signal 26d causes the image sensor 14b to store signal charges in the main and subregions 140b and 140c of the individual photosensitive cell 140 during an exposure period of time. The signal charges are read out from the main and subregions 140b and 140c to the vertical transfer registers 142 either independently or simultaneously in accordance with the conditions as stated previously. The signal charges are then transferred to horizontal transfer registers, not shown, and then converted to corresponding analog voltage signals 14c via an output amplifier not shown.

The monitor 28, which receives the image data 18c from the signal processor 18, is generally implemented by an LC (Liquid Crystal) monitor. An LC controller, not shown, applies a voltage in accordance with the image data 18c for thereby switching the orientation of LC molecules. That enables the monitor 28 to display the image data 18c in the form of a picture. The LC monitor may, of course, be replaced with any other miniature, power-saving display unit, which allows the user to confirm a picture viewed thereon, and saves power.

The storage 30 includes a recording medium for storing the image data fed from the signal processor 18. The recording medium may be implemented by any one of a semiconductor memory, an optical disk, a magneto-optical disk and so forth. In the storage 30, data are written into or read out from the recording medium by an optical pickup or the combination of an optical pickup and a magnetic head coping with the kind of the recording medium and also controlled by the system controller 20.

With the configuration described above, the digital camera 10 produces a picture representative of a desired scene. The sensitivity control circuit 32, which is one of characteristic features of the illustrative embodiment, will be described more specifically hereinafter.

The sensitivity control circuit 32 includes the sensitivity error detector 180, timing signal generator 24 and driver 26, as stated earlier. If desired, the sensitivity error detector 18 may be positioned outside of the camera 10 as a jig, as also stated previously, in witch case the timing signal generator 24 and driver 26 will constitute the sensitivity control circuit 32. In any case, the timing signal generator 24 receives a control signal 20b representative of a sensitivity error ascribable to the offset of a fabricating mask and output from the system controller 20 on the basis of the estimated values 18a. In response, the timing signal generator 24 generates a timing signal that adjusts the exposure start timing with respect to the main and subregions 140b and 140c of the individual photosensitive cell 140 in accordance with the direction or polarity of the sensitivity error, which is positive (+) or negative (−). The timing signal thus generated delays the exposure start timing in dependence upon the amount of the sensitivity error. The driver 26 feeds the drive signal 26c to the mechanical shutter 12a in response to the control signal 20c, causing the shutter 12a to close at the same time for both of the main and subregions 140b and 140c.

As stated above, the camera 10 can correct a sensitivity error ascribable to the offset of a fabricating mask with the sensitivity control circuit 32 for thereby establishing an adequate range of image reproduction, or latitude.

Figure 3A:
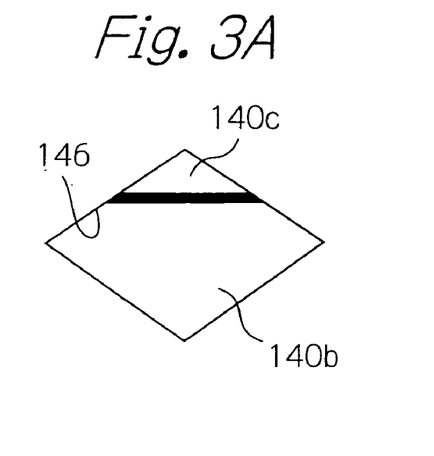
FIG. 3A shows in a schematic plan view part of the photosensitive regions which appears through an optical opening correctly positioned.
Figure 3B:
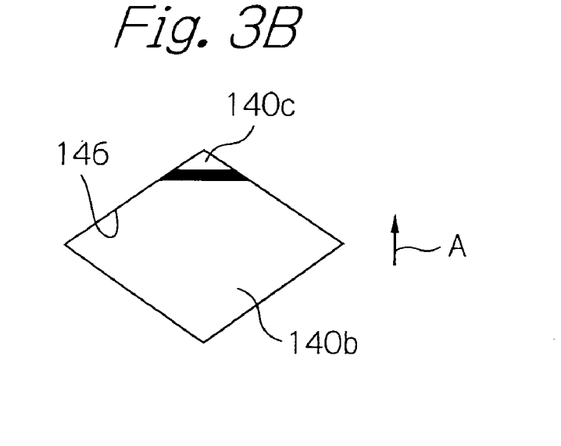
FIGS. 3B and 3C show, similarly to FIG. 3A, how the optical openings are set off in the vertical directions.

Sensitivity error correction unique to the illustrative embodiment will be described more specifically hereinafter. Let attention be paid to the optical opening 146 of the individual photosensitive cell 140. As shown in FIG. 3A, so long as the light-screening layer 144 is formed without being set off relative to the photosensitive area on a manufacturing line, the optical opening 146 implements the main and subregions 140b and 140c as accurately as designed. However, as shown in FIG. 3B, if the light-screening layer 144 is shifted or set off vertically, i.e. in the direction of Y axis of the photosensitive array, as indicated by an arrow A, then the main and subregions 140b and 140c respectively become larger and smaller in area than in FIG. 3A. Likewise, as shown in FIG. 3C, if the light-screening layer 144 is set off vertically in the direction opposite to FIG. 3B, as indicated by an arrow B, then the main and subregions 140b and 140c respectively become smaller and larger in area than in FIG. 3A.

Figure 3C:
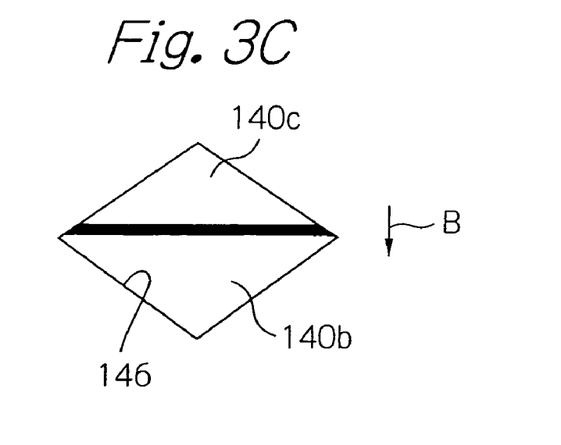

The main region 140b, when the aperture 146 is fabricated to be set off as shown in FIGS. 3B and 3C, varies in area ratio to the entire photosensitive area little, so that the influence of the offset on the resulting sensitivity error is negligible. By contrast, the subregion 140c has originally a small area. This allows, when the aperture 146 is set off even slightly against the regions 140b and 140c, the subregion 140c to noticeably vary in area ratio to the entire photosensitive area, resulting in the noticeable influence on the sensitivity error. For example, in the case of the offset shown in FIG. 3B, the area ratio of the subregion 140c to the entire photosensitive area varies more critically and noticeably so as to affect unneglectably on the sensitivity error. It is therefore preferable to compensate for the sensitivity error of the subregion 140c.

In light of the above, the sensitivity detector 180 determines a difference of the quantity of light incident to the subregion 140c in the condition shown in FIG. 3B or 3C from the predetermined quantity of light expected to be incident to the subregion 140c in the condition shown in FIG. 3A. The difference thus determined is representative of the amount of a sensitivity error; a sign attached to the difference is representative of the direction or polarity of the error.

Figure 4:
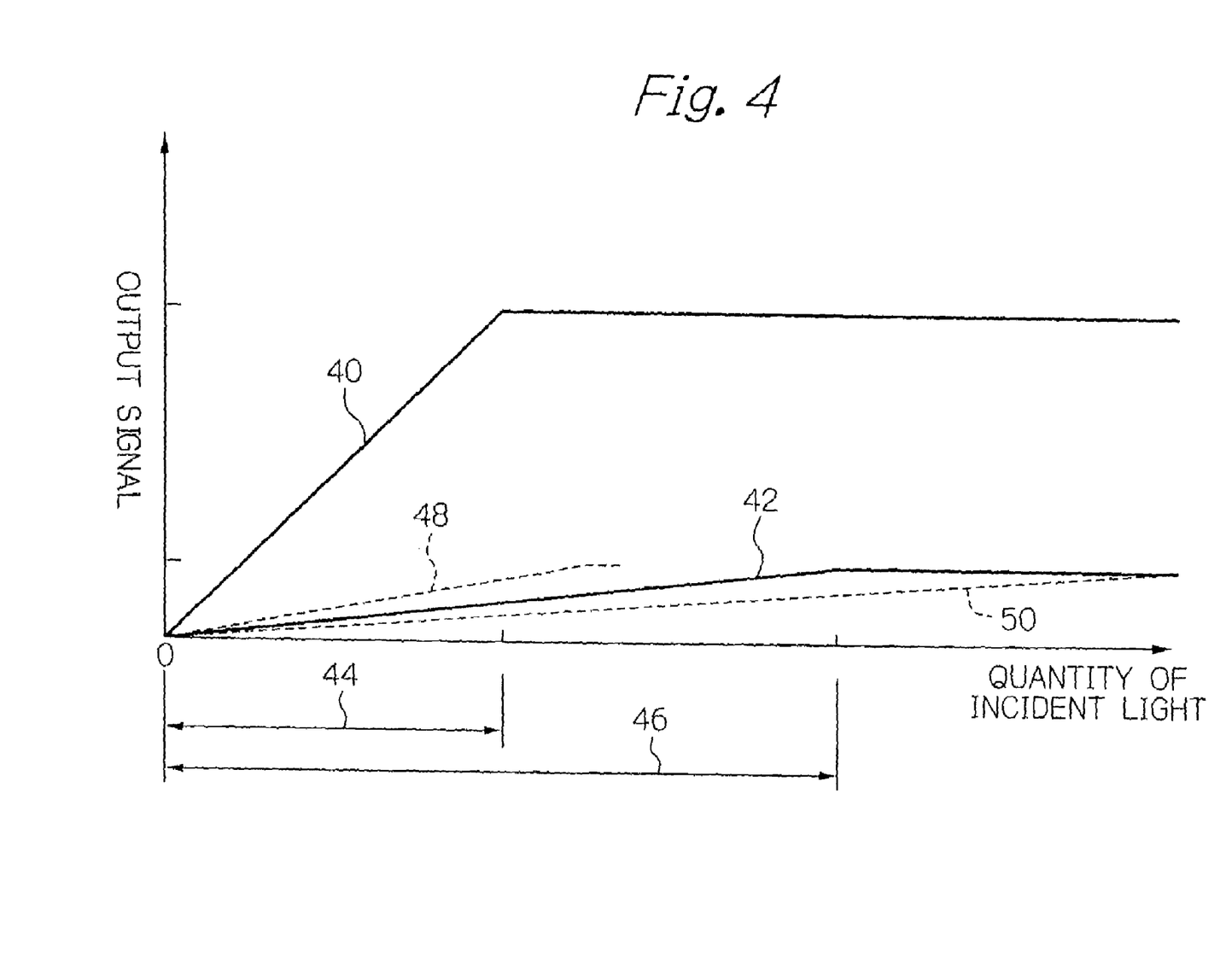
FIG. 4 is a graph showing a relation between the quantity of light incident to a photosensitive cell and the resulting output signal.

FIG. 4 shows a relation between the quantity of incident light and the photoelectric transduction characteristic, i.e. signals output from the main and subregions 140b and 140c. In the illustrative embodiment, for the purpose of explanation only, the photosensitive cell 140 is designed such that the main region 140b has a sensitivity of unity and a saturation level of unity while the subregion 140c has with a sensitivity of ⅛ and a saturation level of ¼. In this condition, the main region 140b receives incident light at its sensitive range of 100% to pickup a subject scene so as to produce an output signal plotted with a solid line 40. On the other hand, the subregion 140c is able to capture a subject scene with incident light at its sensitivity range of 200%, i.e. imagewise information two times as light as the information captured by the main region 140b, producing an output signal plotted with a solid line 42. It follows that the main and subregions 140b and 140c establish image-reproducible ranges 44 and 46, respectively.

If a sensitivity error exists in the subregion 140c due to the offset or shift of a fabrication mask, then the reproducible range 46 is shifted to either direction in dependence upon the direction or polarity of the sensitivity error. More specifically, when the sensitivity error occurs in the positive direction, i.e. the sensitivity increases, the resulting output signal is then derived from a photoelectric transduction characteristic indicated by a dotted line 48, narrowing the reproducible range 46. Conversely, whenever the sensitivity error occurs in the negative direction, i.e. the sensitivity decreases, the resultant output signal will then be what is indicated by a dotted line 50. In this manner, any sensitivity error too sensitively shifts the reproducible range from the intended range 46.

In an application where signals or information output from the main and subregions 140b and 140c are mixed with each other to broaden the reproducible range of an image and hence the dynamic range for thereby reproducing images over the lightness range of, e.g. 200%, the output signal 48 with the error of the positive direction would reach its saturation level earlier than the output signal 42 with the result that the signal 48 carrying imagewise information would be clipped. By contrast, the output signal 50 with the error of the negative direction can reproduce a range broader than the output signal 42 having the reproducible range 46. Thus, even when images captured by the main and subregions 140b and 140c are combined with each other to establish the lightness of 200% for broadening the dynamic range, the dynamic range in the resulting image would widely deviate.

Although the offset of a fabrication mask, which is the original cause of irregularity in dynamic range, cannot be corrected, as stated above, it is possible to solve this problem by compensating for signal charges generated by the photosensitive cells 140 or image signals output from the image sensor 14b. For this purpose, in the illustrative embodiment, the system controller 20 controls the timing signal generator 24 to generate the timing signals with which the exposure time of the subregions 140c is adjusted. This control will be described more specifically with additional reference to FIG. 5 hereinafter.

Figure 5:
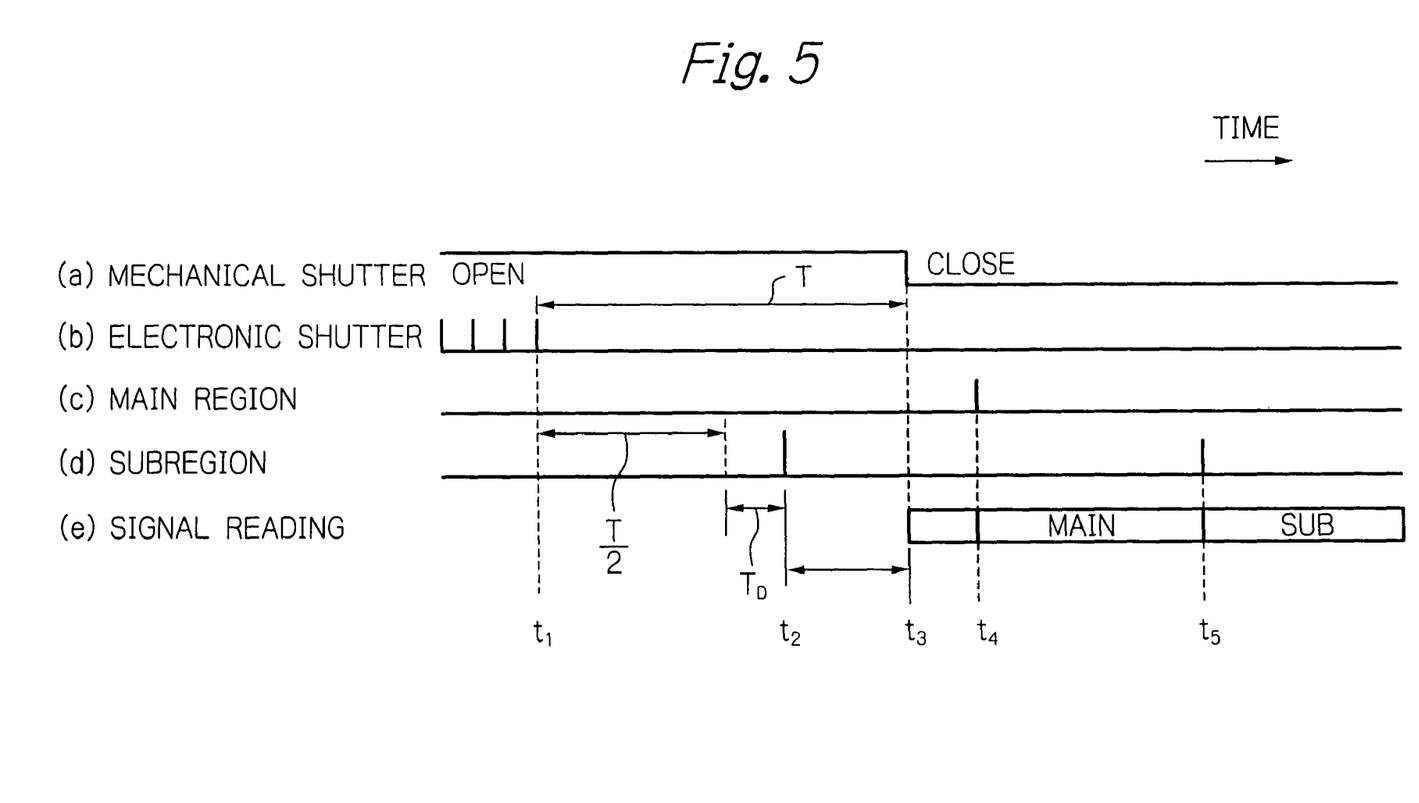
FIGS. 5 and 6 are timing charts useful for understanding the exposure control executed by the illustrative embodiment.

The estimated value 18a representative of the sensitivity error of the image sensor 14b is fed from the signal processor 18 to the system controller 20. The system controller 20 calculates an exposure time and an F-number necessary for image pickup with the dynamic range of 200% in accordance with the estimated value 18a. The exposure time thus calculated is assigned to either one of the main and subregions 140b and 140c in accordance with the direction or polarity of the sensitivity error. The system controller 20 then feeds the driver 26 with control signals 20c for controlling the stop and focal distance of the optics 12 and opening the mechanical shutter 12a. In response, the driver 26 feeds a control signal 26b to the mechanical shutter 12a for causing it to open, as shown in FIG. 5, part(a). Also, as shown in FIG. 5, part(b), OFD pulses, serving as an electronic shutter pulses, are delivered to the main and subregions 140b and 140c at predetermined intervals up to a time $t_1$ at which actual pickup with the photosensitive cells 140 begins in response to the second stroke of the release button.

As shown in FIG. 5, part(c), an exposure period of time T commences at the time $t_1$ for the main region 140b. With the illustrative embodiment, the system controller 20 uses the main region 140b as a reference, when the sensitivity error takes the positive direction, to establish the exposure period of time T. Also, the system controller 20 establishes an exposure time for the subregion 140c. The exposure time will be T/2 if no sensitivity errors are present, while picking up images with the reproduction range of 200%. However, because the sensitivity error is present in this specific case, the system controller 20 reduces the amount of sensitivity error to a period of time of $T_D$, as shown in FIG. 5, part(d). Consequently, the exposure time assigned to the subregion 140c will be $T-(T/2+T_D)$. The system controller 20 sends out a control signal 20b to the timing signal generator 24. In response, the timing signal generator 24 delivers a timing signal 24d to the driver 26, so that the driver 26 feeds a drive signal 26d to the image sensor 14b. At a time $t_2$, OFD pulses are applied to the subregion 140c with the result that a signal charge generated in the subregion 140c up to the time $(T/2+T_D)$ is swept out to the vertical transfer register adjoining it. Exposure with the subregion 140c begins at the time $t_2$.

Subsequently, the system controller 20 causes the mechanical shutter 12a to close at a time $t_3$, so that the main and subregions 140b and 140c are screened from light at the same time. During the interval between the time $t_3$ and a time $t_4$, the system controller 20 causes the signal charge of the vertical transfer register 142 to be swept out. At the time $t_4$, a field shift pulse is applied for causing the signal charge of the main region 140b to be read out to the vertical transfer register 142. During the interval between the time $t_4$ and a time $t_5$, the signal charge read out is sequentially transferred in the vertical and horizontal directions in this order. The pickup section 14 delivers the resulting analog voltage signal to the preprocessor 16.

At the time $t_5$, a field shift gate pulse is applied for reading out the signal charge from the subregion 140c to the vertical transfer register 142. As a result, an analog voltage signal 14c is fed to the preprocessor 16 in the same manner as stated above. In this manner, signal charges are read out from a single photosensitive cell 140 as in the case of interlace scanning, and then subjected to sensitivity error correction.

Figure 6:
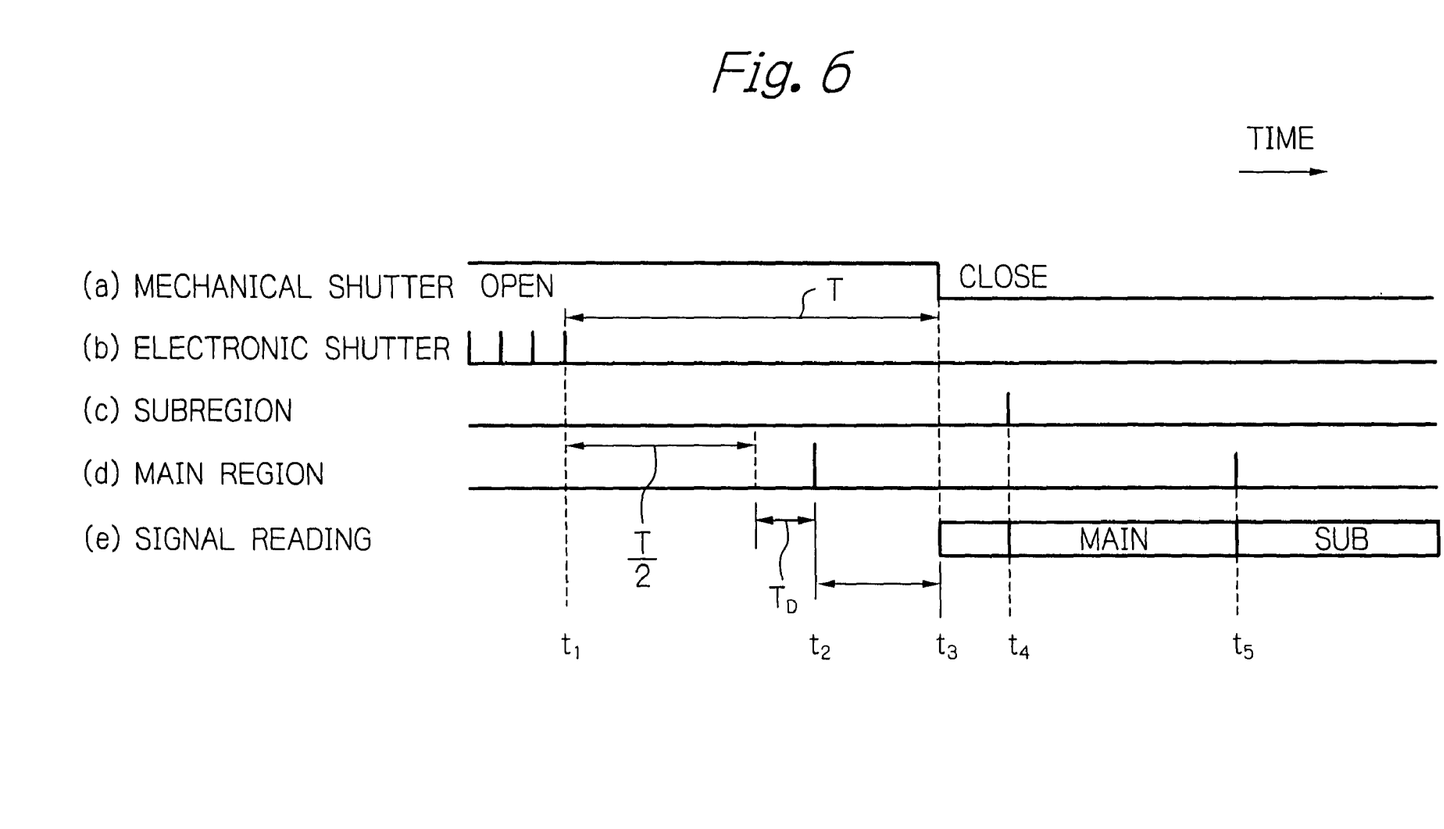

Reference will be made to FIG. 6 for describing a case wherein the direction of sensitivity error is negative. In this case, the illustrative embodiment takes the subregion 140c as a reference. Since the photoelectric transduction characteristic 50, FIG. 4, including the sensitivity error, is taken as a reference, the reference exposure time T calculated by the system controller 20 is longer than the photoelectric transduction characteristic 42, FIG. 4. In FIG. 6, parts (a) and (b), the mechanical shutter 12a and the electronic shutter operate in exactly the same manner as in FIG. 5, parts (a) and (b). The main region 140b should preferably be exposed in the range of 200% so as to realize the reproducible range 44. The exposure in the range of 200% is controlled by the system controller 20 in such a manner that photoelectric transduction is discarded over the period substantially equal to the sum of one-half of the exposure time T for the exposure in the range of 200% (T/2) and the converted period of time $T_D$, i.e. T−(T/2+$T_D$). The procedure to follow is identical with the procedure described in relation to the sensitivity error of positive direction.

By executing the procedure described above, the illustrative embodiment compensates for a sensitivity error introduced during the formation of the light-screening layers 144 on a manufacturing line. Therefore, the illustrative embodiment allows even products that would otherwise be excluded due to the optical openings set off in the layers 144 to be effectively utilized, thus increasing the yield of solid-state image sensors.

The illustrative embodiment may be modified such that the system controller 20 additionally executes gain amplification with the pixel signals derived from the subregions 140c in accordance with the sensitivity error. More specifically, in such a modification, by matching the amplification timing to the gain of the GCA included in the preprocessor 16, FIG. 1, the system controller 20 raises the gradient relating to the subregion 140c from the line 50 to the line 42, FIG. 4. However, the problem with such gain amplification is that it amplifies noise as well, lowering the S/N (Signal-to-Noise) ratio. To solve this problem, the allowable range of the system controller 20 as to the fall of the S/N ratio may be limited, in which case the sensitivity error will be compensated for by exposure control when the fall of the S/N ratio exceeds the allowable range.

In the illustrative embodiment and modification thereof described above, based on the direction (direction of Y axis) and amount of the offset from a designed optical opening, the system controller 20 feeds the timing signal generator 24 and driver 26 with control signals 20b and 20c, respectively, which are to adjust the exposure times for the main and subregions 140b and 140c even when the optical opening 146 of the light-screening layer 144 is set off during manufacturing. In response, the timing signal generator 24 feeds a timing signal 24d to the driver 26. The driver 26 feeds the image sensor 14b with a drive signal 26d matching with the timing signal 24d and a drive signal relating to the mechanical shutter 12a, thereby causing exposure with the main and subregions 140b and 104c to end at the same time. The resulting signal charges 14c will be free from errors. This not only surely implements intended lightness information, but also enhances the S/N ratio.

Further, either one of the main and subregions 140b and 140c is selected as a reference independence upon the polarity of the offset, i.e. the positive direction or the negative direction, of the fabrication mask. Subsequently, the exposure time of the region other than the reference region is converted in accordance with the amount or ratio of the offset, so that drive signals are output with the exposure time thus converted being taken into account. This accurately compensates for the offset that is conspicuous in the subregion 140c of the individual photosensitive cell 140.

Alternatively, the system controller 20 may be adapted to execute the gain amplification on the pixel signals derived from the subregions 140c in dependence on the sensitivity error in the negative direction to adjust the gradient of the gain amplification so as to attain the normal reproducible range 46, whereby the lightness information can be corrected free from the sensitivity error.

While the individual photosensitive cell 140 has been shown and described as being divided into the main and subregions 140b and 140c, the main and subregions each may be implemented as an independent photosensitive cell in the bidimensional array pattern, if desired.

To adjust the output adaptively to the sensitivity, the illustrative embodiment may compare actual sensitivity with a predetermined value and to detect the amount and direction of the sensitivity offset of the subregion 140c, select the region to be used as a reference in dependence on the direction of sensitivity offset, and execute control in dependence on the offset of the subject region. This allows the offset of the subject region to be compensated for not only with the predetermined quantity of light that derived the sensitivity offset, but also in terms of a correction ratio between the quantities of light incident to the main and subregions, so that an output identical with the predetermined desired sensitivity of the subregion 140c can be achieved. Such a correction procedure, not including amplification, is desirable from the S/N ratio standpoint and enhances the yield of solid-state image sensors.

In summary, it will be seen that the present invention provides a solid-state image sensor capable of compensating for a sensitivity error not only with a predetermined quantity of light that derived the error, but also in terms of a correction ratio between quantities of light, thereby producing an output identical with the desired sensitivity of a subregion. Also, the present invention provides a sensitivity-adaptive output adjusting method capable of accurately compensating, if a fabrication mask is set off during manufacturing, for the offset at the stage of actual use without resorting to amplification. The method of the present invention is therefore desirable from the S/N ratio standpoint and enhances the yield of solid-state image sensors.

The entire disclosure of Japanese patent application No. 2002-237881 filed on Aug. 19, 2002, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pickup apparatus comprising:
a solid-state image sensor comprising a plurality of photosensitive cells arranged in a two-dimensional array for converting incident light to electric signals, each of said plurality of photosensitive cells including a main region and a subregion smaller in area than said main region;
a shutter for adjusting an end of an exposure time over which light incident to said solid-state image sensor is subject to photoelectric transduction;
a sensitivity control circuit for comparing actual sensitivity of each of said subregions for a predetermined quantity of light with predetermined sensitivity of the subregion for the predetermined quantity of incident light to determine a sensitivity error and compensating for the sensitivity error,
wherein the sensitivity control circuit controls said exposure time over said subregions to adjust the predetermined sensitivity of the subregion in terms of a correction ratio between the quantities of light incident to the main and subregions; and
a system controller for controlling, in response to an image pickup operation meant for said solid-state image sensor, said sensitivity control circuit in accordance with a direction of the sensitivity error.

2. The apparatus in accordance with claim 1, wherein each of said plurality of photosensitive cells has a photosensitive area divided into the main region and the subregion different in area from each other.

3. The apparatus in accordance with claim 2, wherein said sensitivity control circuit comprises:
a sensitivity error detector for comparing the actual sensitivity with the predetermined sensitivity for determining the direction and an amount of the sensitivity error; and
an error adjuster for adjusting the direction and the amount of the sensitivity error.

4. The apparatus in accordance with claim 3, wherein said system controller amplifies a signal output from said subregion when the negative error is detected.

5. The apparatus in accordance with claim 4, wherein said sensitivity error adjuster amplifies, under control of said system controller, a signal output from said subregion by the amount of the negative error.

6. The apparatus in accordance with claim 3, wherein said system controller detects the sensitivity error in the direction in which the actual sensitivity becomes greater than the predetermined sensitivity and the sensitivity error in the direction which the actual sensitivity becomes smaller than the predetermined sensitivity as a positive error and a negative error, respectively,
said system controller using, on detecting the positive error, an exposure time of said main region as a reference to delay a start of the exposure time of said subregion in dependence upon the amount of the positive error, and using, on detecting the negative error, an exposure time of said subregion as a reference to delay the exposure time of said main region in dependence upon an amount of the negative error.

7. The apparatus in accordance with claim 6, wherein said sensitivity error adjuster comprises:
a timing signal generator for generating, under control of said system controller, a timing signal for causing the exposure time in dependence upon the amount of the sensitivity error to start; and
a driver for feeding a drive signal to said solid-state image sensor in response to the timing signal.

8. The apparatus in accordance with claim 2, wherein said system controller detects the sensitivity error in the direction in which the actual sensitivity becomes greater than the predetermined sensitivity and the sensitivity error in the direction which the actual sensitivity becomes smaller than the predetermined sensitivity as a positive error and a negative error, respectively,
said system controller using, on detecting the positive error, an exposure time of said main region as a reference to delay a start of the exposure time of said subregion in dependence upon the amount of the positive error, and using, on detecting the negative error, an exposure time of said subregion as a reference to delay the exposure time of said main region in dependence upon an amount of the negative error.

9. The apparatus in accordance with claim 8, wherein said sensitivity error adjuster comprises:
a timing signal generator for generating, under control of said system controller, a timing signal for causing the exposure time in dependence upon the amount of the sensitivity error to start; and
a driver for feeding a drive signal to said solid-state image sensor in response to the timing signal.

10. The apparatus in accordance with claim 1, wherein said sensitivity control circuit comprises:
a sensitivity error detector for comparing the actual sensitivity with the predetermined sensitivity for determining the direction and an amount of the sensitivity error; and an error adjuster for adjusting the direction and the amount of the sensitivity error.

11. The apparatus in accordance with claim 10, wherein said system controller detects the sensitivity error in the direction in which the actual sensitivity becomes greater than the predetermined sensitivity and the sensitivity error in the direction which the actual sensitivity becomes smaller than the predetermined sensitivity as a positive error and a negative error, respectively,
said system controller using, on detecting the positive error, an exposure time of said main region as a reference to delay a start of the exposure time of said subregion in dependence upon the amount of the positive error, and using, on detecting the negative error, an exposure time of said subregion as a reference to delay the exposure time of said main region in dependence upon an amount of the negative error.

12. The apparatus in accordance with claim 11, wherein said sensitivity error adjuster comprises:
a timing signal generator for generating, under control of said system controller, a timing signal for causing the exposure time in dependence upon the amount of the sensitivity error to start; and
a driver for feeding a drive signal to said solid-state image sensor in response to the timing signal.

13. The apparatus in accordance with claim 1, wherein said system controller detects the sensitivity error in the direction in which the actual sensitivity becomes greater than the predetermined sensitivity and the sensitivity error in the direction which the actual sensitivity becomes smaller than the predetermined sensitivity as a positive error and a negative error, respectively,
said system controller using, on detecting the positive error, an exposure time of said main region as a reference to delay a start of the exposure time of said subregion in dependence upon the amount of the positive error, and using, on detecting the negative error, an exposure time of said subregion as a reference to delay the exposure time of said main region in dependence upon an amount of the negative error.

14. The apparatus in accordance with claim 13, wherein said sensitivity error adjuster comprises:
   a timing signal generator for generating, under control of said system controller, a timing signal for causing the exposure time in dependence upon the amount of the sensitivity error to start; and
   a driver for feeding a drive signal to said solid-state image sensor in response to the timing signal.

15. A method of adjusting outputs of photosensitive cells in accordance with sensitivity, comprising:
   a first step of arranging a plurality of photosensitive cells in a two-dimensional array for converting incident light to electric signals, each of the plurality of photosensitive cells including a main region and a subregion smaller in than the main region;
   a second step of comparing actual sensitivity of each of the subregions for a predetermined quantity of light with predetermined sensitivity of the subregion for the predetermined quantity of incident light to determine a direction and an amount of a sensitivity error;
   a third step of designating, in dependence upon the direction of the sensitivity error, either one of the main region and the subregion as a reference region while handling the other region as a subject region to be adjusted, and executing control for canceling the amount of the sensitivity error of the subject region, wherein the third step controlling said exposure time over said subregions to adjust the predetermined sensitivity of the subregion in terms of a correction ratio between the quantities of light incident to the main and subregions; and
   a fourth step of executing processing for canceling the amount of the sensitivity error derived from the subject region in accordance with the control.

16. The method in accordance with claim 15, wherein said third step comprises:
   a substep of detecting the sensitivity error in the direction in which the actual sensitivity becomes greater than the predetermined sensitivity and the sensitivity error in the direction which the actual sensitivity becomes smaller than the predetermined sensitivity as a positive error and a negative error, respectively; and
   a substep of using, on detecting the positive error, an exposure time of the main region as a reference to delay a start of the exposure time of the subregion in dependence upon the amount of the positive error or using, on detecting the negative error, the exposure time of the subregion as a reference to delay the exposure time of the main region in dependence upon an amount of the negative error.

17. The method in accordance with claim 15, wherein said third step comprises a substep of amplifying a signal output from the subregion when the negative error is detected.

18. The method in accordance with claim 16, wherein said third step comprises a substep of amplifying a signal output from the subregion when the negative error is detected.

* * * * *